(12) United States Patent
Herold et al.

(10) Patent No.: US 9,544,470 B2
(45) Date of Patent: Jan. 10, 2017

(54) INK MANAGEMENT AND MONITORING MECHANISM

(75) Inventors: James M. Herold, Greeley, CO (US); Jeffrey A. Schilling, Denver, CO (US)

(73) Assignee: Ricoh Company, Ltd., Tokyo (JP)

( * ) Notice: Subject to any disclaimer, the term of this patent is extended or adjusted under 35 U.S.C. 154(b) by 998 days.

(21) Appl. No.: 12/784,684

(22) Filed: May 21, 2010

(65) Prior Publication Data

US 2011/0285766 A1 Nov. 24, 2011

(51) Int. Cl.
G06F 15/00 (2006.01)
H04N 1/46 (2006.01)
G03G 15/01 (2006.01)
G03G 15/00 (2006.01)
H04N 1/60 (2006.01)

(52) U.S. Cl.
CPC .............. *H04N 1/46* (2013.01); *G03G 15/01* (2013.01); *G03G 15/50* (2013.01); *H04N 1/603* (2013.01)

(58) Field of Classification Search
CPC .................................................. H04N 1/00896
USPC ............ 382/100; 358/1.9, 1.13; 347/5, 9, 43
See application file for complete search history.

(56) References Cited

U.S. PATENT DOCUMENTS

| 5,592,298 | A | 1/1997 | Caruso |
| 6,317,218 | B1 * | 11/2001 | Yorkey et al. ............... 358/1.13 |
| 6,718,878 | B2 | 4/2004 | Grosso et al. |
| 7,116,444 | B2 * | 10/2006 | Barry et al. .................. 358/1.9 |
| 7,172,260 | B2 | 2/2007 | Yoshida et al. |
| 7,576,883 | B2 | 8/2009 | Ragnet et al. |
| 2003/0164971 | A1 * | 9/2003 | Kidani et al. ................ 358/1.13 |
| 2006/0233587 | A1 | 10/2006 | Vondran, Jr. et al. |
| 2008/0111842 | A1 | 5/2008 | Hall et al. |
| 2008/0273224 | A1 | 11/2008 | Maulsby et al. |
| 2009/0016748 | A1 | 1/2009 | Ferlitsch |
| 2009/0141930 | A1 * | 6/2009 | Kiwada ......................... 382/100 |

\* cited by examiner

*Primary Examiner* — Lam Nguyen
(74) *Attorney, Agent, or Firm* — Blakely, Sokoloff, Taylor & Zafman LLP

(57) ABSTRACT

A method is disclosed. The method includes receiving a print job to be printed, determining if the print job is to be printed as a monochrome print job, invoking a monochrome International Color Consortium (ICC) profile if the print job is determined to be a monochrome print job, printing the monochrome print job and tracking a first print volume during periods in which the monochrome ICC profile has been invoked.

15 Claims, 2 Drawing Sheets

INK MANAGEMENT AND MONITORING MECHANISM

FIELD OF THE INVENTION

This invention relates generally to the field of printing systems. More particularly, the invention relates to managing, controlling and monitoring ink usage in a color printing system.

BACKGROUND

Print systems include presentation architectures that are provided for representing documents in a data format that is independent of the methods that are utilized to capture or create those documents. One example of a presentation system is the (Advanced Function Presentation) AFP™ system developed by International Business Machines Corporation. Other examples of presentation systems include Portable Document Format (PDF) and PostScript (PS). According to these systems, documents may include mixed content data objects (e.g., combinations of text, image, graphics, etc.).

Moreover, these print systems typically perform color printing using a, combination of cyan (C), magenta (M), yellow (Y) and black (K) color inks, where mixed content input color data objects received at a print system are rendered using all colorants. Thus, print jobs designated as having black (or monochrome) objects are sometimes rendered using a combination of color inks in full color print systems.

This results in undesirable CMYK black combinations for print jobs that are to be printed with black only ink because it results in a substantial use of C, M and Y ink to print various shades of black and gray. Since C, M and Y ink are each more expensive, the unnecessary use of these colors results in wasted resources. Further, a higher maintenance fee is incurred for print customers using full color print systems. As a result, a number of print customers are hesitant to move to full color print systems because of the total cost of print is higher for these systems.

In order to encourage a transition from monochrome printing to full color, a mechanism is desired to enable customers to print monochrome pages on full-color systems, while incurring costs and usage fees for single color printing.

SUMMARY

In one embodiment, a method is disclosed. The method includes receiving a print job to be printed, determining if the print job is to be printed as a monochrome print job, invoking a monochrome International Color Consortium (ICC) profile if the print job is determined to be a monochrome print job, printing the monochrome print job and tracking a first print volume during periods in which the monochrome ICC profile has been invoked.

In another embodiment, a printer is disclosed. The printer includes a control unit to identify a print job as a monochrome print job or a color print job. The control unit includes a color management unit to determine color values for each pixel in an object in the print job, and having a first International Color Consortium (ICC) profile invoked by the control unit to print the print job if identified as a monochrome print job and a second ICC profile invoked by the control unit to print the print job if identified as a color print job. The control unit also includes a monitor to track a first print volume during periods in which the first ICC profile has been invoked.

BRIEF DESCRIPTION OF THE DRAWINGS

A better understanding of the present invention can be obtained from the following detailed description in conjunction with the following drawings, in which.

DETAILED DESCRIPTION

A mechanism for managing and monitoring monochrome print jobs in a full color system is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
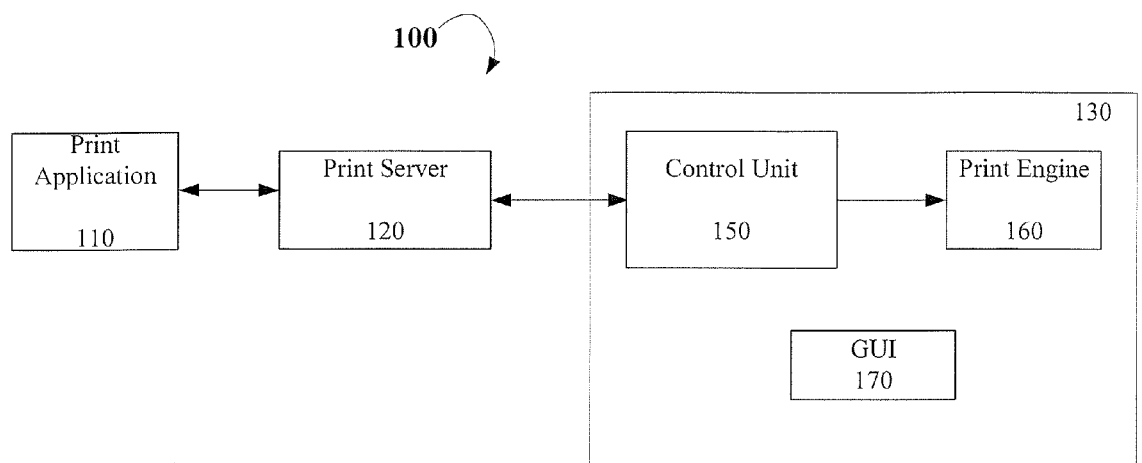
FIG. 1 illustrates one embodiment of a printing system.

FIG. 1 illustrates one embodiment of a printing system 100. Printing system 100 includes a print application 110, a server 120 and printer 130. Print application 110 makes a request for the printing of a document. In one embodiment, print application 110 provides AFP, PS and PDF files for printing to print server 120.

Figure 2:
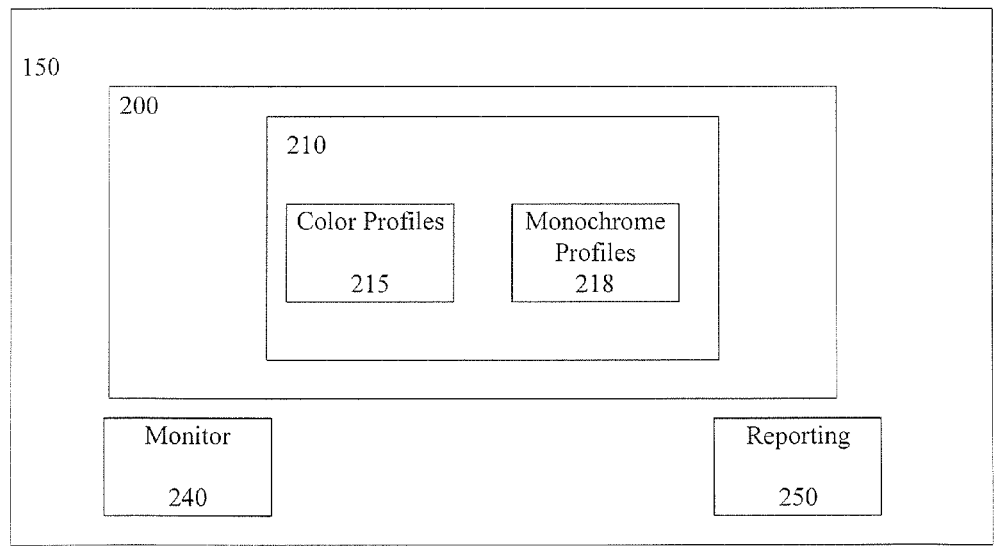
FIG. 2 illustrates one embodiment of a control unit.

Printer 130 includes a control unit 150 and a print engine 160. According to one embodiment, control unit 150 processes and renders objects received from print server 120 and provides sheet maps for printing to print engine 160. FIG. 2 illustrates one embodiment of a control unit 150. Control unit 150 includes a rasterizer 200.

Rasterizer 200 is implemented to process image objects received at control unit 150 by performing a raster image process (RIP) to convert an image described in a vector graphics format (e.g., shapes) into a raster image (e.g., pixels) for output to print engine 160. Rasterizer 200 includes a color management unit 210 that provides a color mapping from a source to a destination color space.

In one embodiment, color management unit 210 uses International Color Consortium (ICC) profiles to perform the mapping to determine CMYK values for each pixel in a particular object to be printed at print engine 160. According to one embodiment, color management unit 210 includes color ICC profiles 215 and monochrome ICC profiles 218. Color profiles 215 includes various profiles used to print full color print jobs, while monochrome profiles 218 includes one or more profiles to be used for monochrome or single ink (e.g., blacks, grays, etc.) ink.

In one embodiment controller 150, identifies and controls print jobs that will use black only ink. In this embodiment, controller 150 invokes one of monochrome profiles 218 whenever a print job is identified as a monochrome print job.

In one embodiment, a printer 130 operator may select a type of print job (color or monochrome) using a Graphical User Interface (GUI) 170.

Subsequently, controller 150 invokes one of color profiles 218 or monochrome profiles 218 based upon the selection. In another embodiment, the operator may select one of a list of print job jobs at GUI 170, where each print job is designated as either full color or monochrome. Upon selection of the print job controller 150 invokes a corresponding ICC profile.

Control unit 150 also includes a monitor 240 that monitors the type of ICC profile that has been invoked (color or monochrome) and tracks the print volume (in feet) during the period in which each of the profile types are invoked. Further, control unit 150 includes a reporting module 250 that generates precise volumes of monochrome pages that have been printed. However in other embodiments, reporting module 250 generates volume reports for both monochrome and color pages.

According to one embodiment, the information collected at monitor 240 and reporting module 250 are forwarded to a printing software product at print server 120 in order to facilitate the generation of a report results regarding the usage of printer 130. The report may subsequently be incorporated into a maintenance billing report printer 130. In one embodiment, the report may include data for a volume of black only pages printed at printer 103. However, other embodiments may include usage data for both color and black only pages.

Figure 3:
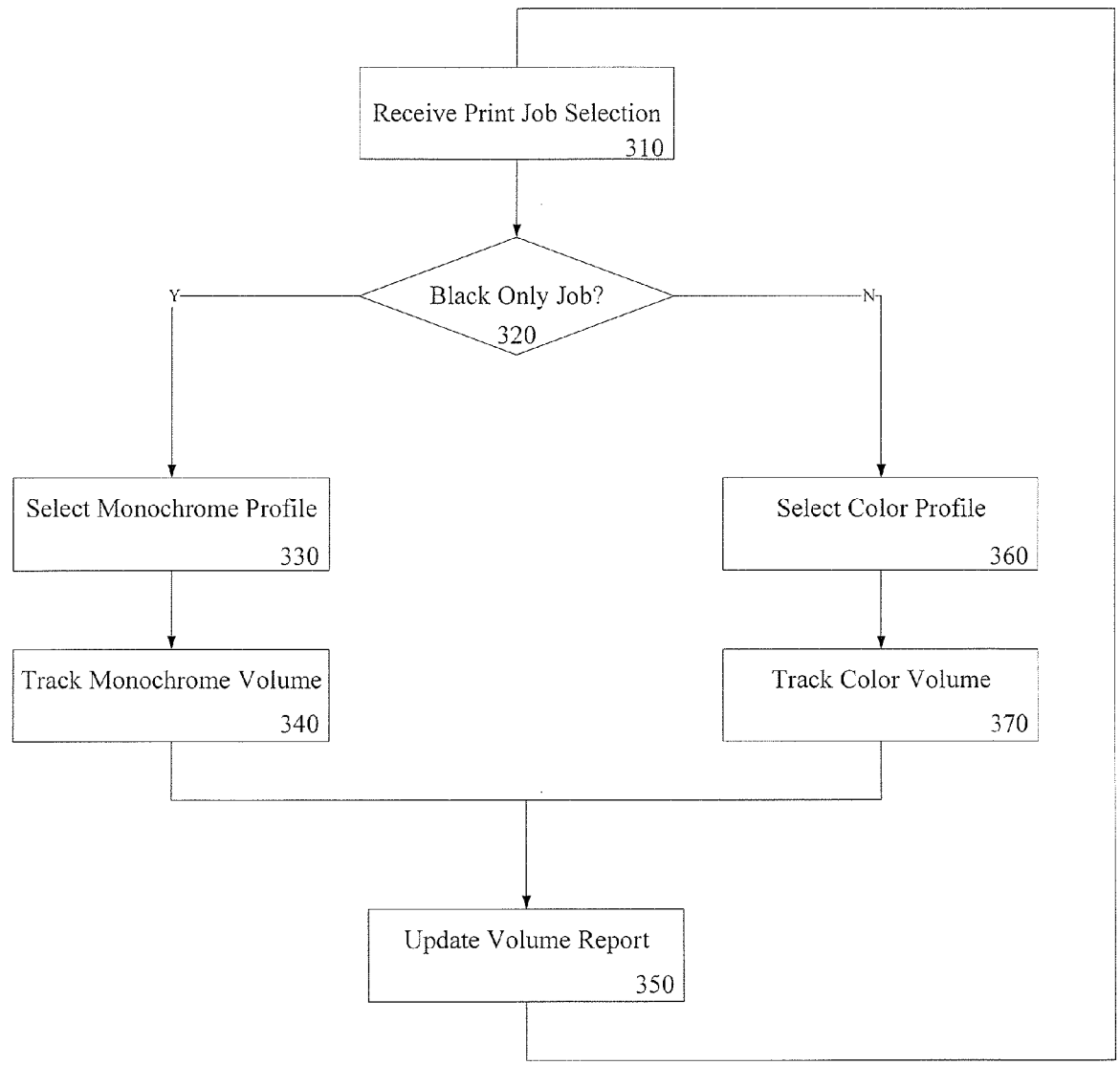
FIG. 3 is a flow diagram illustrating one embodiment of color monitoring.

FIG. 3 is a flow diagram illustrating one embodiment of color monitoring at printer 103. At processing block 310, a print job is received at printer 103. At decision block 320, it is determined whether the print job is a black only print job. If so, one of monochrome profiles 218 is invoked, processing block 330. At processing block 340, monitor 240 tracks the volume of the black only print job. At processing block 350, a black only volume tracking at reporting module 250 is updated. Subsequently, control is returned to processing block 310 where another print job is received.

If it is determined that the print job is a full color print job, one of color profiles 215 is invoked, processing block 360. At processing block 370, monitor 240 tracks the volume of the color print job. At processing block 350, a color volume tracking at reporting module 250 is updated before control is again returned to processing block 310 where another print job is received.

The above-described mechanism enables tracking single ink printing (e.g., black) on a multiple ink printing system, while varying usage charges can depending on single ink or color printing. Further, ink usage can be restricted and reported, or applied systematically, in instances such as substituting process black (for K black) when using more expensive inks (e.g., MICR).

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is:

1. A printer comprising:
a graphical user interface to select from among a list of print jobs designated as either monochrome or color;
a control unit to identify a print job as a monochrome print job or a color print job, the control unit including:
a color management unit having:
a first set of International Color Consortium (ICC) profiles; and
a second set of ICC profiles, wherein the control unit invokes a first profile within the first set of ICC profiles to perform color mapping from a source color space to a destination color space upon a determination that the print job is a monochrome print job, and invokes a first profile within the second set of ICC profiles to perform color mapping from the source color space to a destination color space upon a determination that the print job is a color print job; and
a monitor to track a print volume of the monochrome print job during periods in which the first set of ICC profiles has been invoked and track a print volume of the color print job during periods in which the second set of ICC profiles has been invoked.

2. The printer of claim 1 further comprising a reporting module to generate a volume report of monochrome pages that have been printed.

3. The printer of claim 2 wherein the reporting module generates a volume report of monochrome and color pages that have been printed.

4. The printer of claim 1 wherein the GUI enables an operator to select the print job as a monochrome print job or a color print job.

5. The printer of claim 4 further wherein the control unit identifies the print job based upon the selection at the GUI.

6. The printer of claim 1 further comprising a print engine coupled to the control unit to apply the print job on to a medium.

7. A method comprising:
receiving a print job to be printed;
determining whether the print job is to be printed as a monochrome print job;
invoking a first profile within a set of monochrome International Color Consortium (ICC) profiles to perform color mapping from a source color space to a destination color upon a determination that the print job is a monochrome print job;
printing the monochrome print job;
tracking a print volume of the monochrome print job during periods in which the first ICC profile has been invoked;
invoking a first profile within a set of color ICC profiles to perform color mapping from the source color space to a destination color upon a determination that the print job is a color print job; and tracking a print volume of the color print job during periods in which the second ICC profile has been invoked.

8. The method of claim 7 further comprising updating a monochrome print volume after printing the monochrome print job.

9. The method of claim 7 further comprising: printing the color print job.

10. The method of claim 7 further comprising updating a color print volume after printing the color print job.

11. The method of claim 10 further comprising transmitting the monochrome and the print volume color print volume to a printing software product to facilitate the generation of a report results regarding print usage.

12. An article of manufacture comprising a machine-readable medium including data that, when accessed by a machine, cause the machine to perform operations comprising:

receiving a print job to be printed;

determining whether the print job is to be printed as a monochrome print job;

invoking a first profile within a set of monochrome International Color Consortium (ICC) profiles to perform color mapping from a source color space to a destination color upon a determination that the print job is a monochrome print job;

printing the monochrome print job;

tracking a print volume of the monochrome print job during periods in which the first ICC profile has been invoked;

invoking a first profile within a set of color ICC profiles to perform color mapping from the source color space to a destination color upon a determination that the print job is a color print job; and tracking a print volume of the color print job during periods in which the second ICC profile has been invoked.

13. The article of manufacture of claim 12 when accessed by the machine, further cause the machine to perform operations comprising updating a monochrome print volume after printing the monochrome print job.

14. The article of manufacture of claim 13 when accessed by the machine, further cause the machine to perform operations comprising:

printing the color print job.

15. The article of manufacture of claim 12 when accessed by the machine, further cause the machine to perform operations comprising updating a color print volume after printing the color print job.

* * * * *